United States Patent
Balasaygun et al.

(10) Patent No.: US 8,089,872 B2
(45) Date of Patent: Jan. 3, 2012

(54) EFFICIENT LOAD BALANCING AND HEARTBEAT MECHANISM FOR TELECOMMUNICATION ENDPOINTS

(75) Inventors: Mehmet C. Balasaygun, Freehold, NJ (US); Frank John Boyle, Broomfield, CO (US); Scott E. Hendrick, Broomfield, CO (US); Renee F. Krahn, Superior, CO (US); Manish Marwah, Boulder, CO (US); Sung H. Moon, Thornton, CO (US); Nancy Kathryn Schmidt, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 154 days.

(21) Appl. No.: 12/201,383

(22) Filed: Aug. 29, 2008

(65) Prior Publication Data

US 2008/0317060 A1 Dec. 25, 2008

Related U.S. Application Data

(62) Division of application No. 11/170,659, filed on Jun. 28, 2005, now Pat. No. 7,668,100.

(51) Int. Cl.
*H04L 1/00* (2006.01)

(52) U.S. Cl. ..................... 370/230; 370/395.2

(58) Field of Classification Search .......... 370/229–235, 370/242–246, 248, 254–258, 395.1–395.21; 455/466
See application file for complete search history.

(56) References Cited

U.S. PATENT DOCUMENTS

| | | | |
|---|---|---|---|
| 5,206,903 A | 4/1993 | Kohler et al. | |
| 5,828,747 A | 10/1998 | Fisher et al. | |
| 5,905,793 A | 5/1999 | Flockhart et al. | |
| 5,982,873 A | 11/1999 | Flockhart et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,434,226 B1 | 8/2002 | Takahashi | |
| 6,604,142 B1 | 8/2003 | Bertrand et al. | |
| 6,665,293 B2 | 12/2003 | Thornton et al. | |
| 7,339,934 B2 | 3/2008 | Mussman et al. | |
| 7,366,110 B2 | 4/2008 | Gillespie et al. | |
| 7,372,815 B2 | 5/2008 | Ueno | |
| 7,483,369 B2 | 1/2009 | Chavez et al. | |
| 7,496,056 B2 | 2/2009 | Ohrstrom Sandgren et al. | |
| 7,564,793 B2 | 7/2009 | Baldwin et al. | |
| 2002/0032800 A1* | 3/2002 | Puuskari et al. | 709/246 |

(Continued)

FOREIGN PATENT DOCUMENTS

JP 2001-007864 1/2001

(Continued)

OTHER PUBLICATIONS

ITU-T Recommendation H.248, "Series H: Audiovisual and Multimedia Systems," International Telecommunication Union (Jun. 2000), pp. 1-121.

"Separation of Bearer and Signaling for Avaya™ Communication Manager," Avaya, Issue 1 (May 2003), pp. 1-42.

(Continued)

*Primary Examiner* — Pao Sinkantarakorn

(74) *Attorney, Agent, or Firm* — Sheridan Ross P.C.

(57) ABSTRACT

The present invention is directed to load balancing call signaling channels at the times that they are established, the use of variable frequency keep alive mechanisms depending on the state of the call signaling channel, and the establishment of a call signaling channel when resources are available or otherwise based on need.

7 Claims, 6 Drawing Sheets

U.S. PATENT DOCUMENTS

| | | |
|---|---|---|
| 2002/0097729 A1 | 7/2002 | Bouat |
| 2003/0046400 A1 | 3/2003 | Friel et al. |
| 2005/0021619 A1 | 1/2005 | Gomes de Oliveira |
| 2006/0146859 A1 | 7/2006 | Baldwin et al. |
| 2006/0291400 A1 | 12/2006 | Balasaygun et al. |
| 2008/0056226 A1* | 3/2008 | Zhao et al. .................... 370/342 |
| 2009/0116377 A1* | 5/2009 | Nylander et al. ............. 370/216 |

FOREIGN PATENT DOCUMENTS

| | | |
|---|---|---|
| JP | 2001-257726 | 9/2001 |
| JP | 2002-051086 | 2/2002 |
| JP | 2002/118648 | 4/2002 |
| JP | 2002-524004 | 7/2002 |
| JP | 2002/185541 | 12/2002 |
| JP | 2003-198603 | 7/2003 |
| JP | 2003-258837 | 9/2003 |
| WO | WO 00/13075 | 3/2000 |

OTHER PUBLICATIONS

Applicant's Admitted Prior Art: Applicant hereby discloses that the embodiment shown in Figures 1 & 4 is prior art. See background of the Invention for the above captioned application (previously provided), Year: 2005.

Official Action for Japanese Application No. 2006/178,018, mailed Oct. 22, 2008.

Offical Action for U.S. Appl. No. 11/170,659, mailed Jun. 27, 2008.

Official Action for U.S. Appl. No. 11/170,659, mailed Nov. 4, 2008.

Official Action for U.S. Appl. No. 11/170,659, mailed Apr. 21, 2009.

Decision to Grant Japanese Application No. 2006/178018, mailed Sep. 10, 2009.

Notice of Allowance for U.S. Appl. No. 11/170,659, mailed Oct. 19, 2009.

Official Action for European Patent Application No. 06253320.3, dated Feb. 21, 2011.

* cited by examiner

EFFICIENT LOAD BALANCING AND HEARTBEAT MECHANISM FOR TELECOMMUNICATION ENDPOINTS

CROSS REFERENCE TO RELATED APPLICATIONS

The present application is a divisional of U.S. patent application Ser. No. 11/170,659, filed Jun. 28, 2005 to Balasaygun et al. entitled EFFICIENT LOAD BALANCING AND HEARTBEAT MECHANISM FOR TELECOMMUNICATION ENDPOINTS", which is incorporated herein by reference in its entirety.

FIELD

The invention relates generally to telecommunication architectures and particularly to telecommunication architectures including multiple gatekeepers servicing a number of endpoints.

BACKGROUND

FIG. 1 shows an exemplary enterprise telecommunications system. The system 100 includes a primary server 104 providing call control functionality, first, second, . . . nth gatekeepers 108a-n connected to the primary server 104 to provide network administration, and a number of endpoints 112a-n connected to a respective gatekeeper. As used herein, a "gatekeeper" is a computational component that administers traffic flow by performing various functions, such as terminal and gateway registration, address resolution, bandwidth control, admission control, and the like. Every endpoint has an IP address, either a permanent one assigned to a particular network card or a temporary one that is assigned at network login time via a mechanism such as the Dynamic Host Configuration Protocol (DHCP). The server 104 can contain a common database to allow the gatekeepers to share state information. An alternate server 116, such as an Enterprise Survivable Spare processor (ESS) or Local Survivable Processor (LSP), provides redundancy for the endpoints in the event that connectivity is lost with the primary server 104. As will be appreciated, the gatekeeper functionality can co-reside in the server, with the gatekeepers simply providing a front end, or the server can provide a shared database without any gatekeeper functionality.

To make an endpoint eligible to receive service, endpoints must discover/register with a GateKeeper (GK). Registration is done over a Uniform Datagram Protocol or UDP-based Registration, Admissions, and Status or RAS channel. As part of registration, the endpoint is authenticated, receives an Alternate Gatekeeper List or AGL with gatekeeper addresses to failover to if its current gatekeeper fails, and receives a time-to-live parameter within which the endpoint must renew its registration. FIG. 4 shows the registration process as defined by the H.323 protocol. A gatekeeper request is first sent by the endpoint to the primary server/gatekeeper requesting the gatekeeper to service the endpoint. The gatekeeper then responds with a gatekeeper confirm (shown) or reject (not shown) message. When the endpoint receives a gatekeeper confirm message, the endpoint responds with a registration request including, inter alia, the endpoint's IP address, extension, or alias (provided by the user in the endpoint H.323 application). When the registration is successful, the gatekeeper responds with a registration confirm message.

To bring the endpoint into service, a call signaling channel must be established between the endpoint and the gatekeeper/primary server. A Transmission Control Protocol or TCP-based Call Signaling (CS) channel (which is different from the RAS channel), established between an endpoint and its gatekeeper, is commonly used to exchange various call signaling messages including those pertaining to call setup, call termination, capabilities exchange, etc. This channel, initiated by an endpoint or a gatekeeper based on need, may be established at the time of registration or at the time of a call. When established at the time of a call, the channel commonly lasts for only for the call's duration. In one configuration, the channel continues to persist after the call is ended. It may be established between an endpoint and its gatekeeper in gatekeeper-routed call signaling or between calling endpoints in direct endpoint call signaling. The messages and procedures used on the RAS and CS channels are defined in ITU-T H.225.0. Once registered, endpoints may be considered to be in-service without requiring re-registration or CS channel establishment.

An important aspect of the architecture of FIG. 1 is load balancing the CS channels of the endpoints to distribute the channels uniformly among the gatekeepers. The CS channel connections initiated by gatekeepers are easy to load balance because the gatekeeper has information regarding the current load on each gatekeeper. However, this is not true for end-point-initiated connections. Such CS channels can be hard to balance. The number of CS channels at a gatekeeper is constantly changing as calls are made and due to network and other failures. In this dynamic environment, the endpoints do not typically have current information regarding the load on a particular gatekeeper.

Several techniques have been employed to address channel distribution among gatekeepers. First, some products do not even attempt to load balance. This will often lead to an uneven load among gatekeepers, with some getting overloaded while others are only lightly loaded. Second at the time of registration, either gatekeeper load information is sent explicitly to the endpoints or the gatekeeper addresses are specified in increasing order of load. However, the load information is likely to be stale when the endpoint needs to establish the CS channel. Third at the time of registration, gatekeeper addresses can be sent in random order to the endpoints. This approach may work if there are a large number of gatekeepers and no failures. It will not work well in a realistic setting where failures periodically occur. Failures of gatekeepers will cause endpoints to migrate to other gatekeepers. When the failed gatekeepers recover, the endpoints will be unevenly distributed. However, the endpoints will still randomly connect to gatekeepers as if the gatekeepers had uniform distribution of endpoints. Finally when an endpoint tries to establish a CS channel with a gatekeeper, the gatekeeper redirects the endpoint to connect to the least loaded gatekeeper. This solution may work in certain applications but it is inefficient.

Another important aspect of the architecture of FIG. 1 is the use of a heartbeat mechanism to determine when a gatekeeper fails or becomes unreachable so that an endpoint can receive service from an alternate gatekeeper. It is desirable that this failover to an alternate gatekeeper be performed expeditiously so that continuity of service can be maintained for users. If such a failure occurs when the CS channel is not established, it can take a long time for an endpoint to detect failure. Most likely the failure will be discovered when an attempt is made to originate or deliver a call. Thus, failure recovery must be performed as a call is waiting for a user or as a user is dialing digits. In some cases, a timely recovery may be possible but, frequently, this will lead to dropped calls, calls going to a coverage path, or users unable to make a call. Accordingly, it is important that failures be detected and rectified in a prompt and efficient manner.

Several techniques have been employed to address network failures. First, some products do not perform a heartbeat functionality. The CS channel can be recovered as needed (e.g., when a user wants to make a call), regardless of when the failure occurs. However, in come cases the endpoint may not be able to find another gatekeeper in a timely fashion, thereby causing a brief outage. Second, the CS channel may be established immediately at startup and kept up at all times. This approach will work if the CS channel could be established for all the endpoints immediately after registration. However, establishing the CS channel for all the endpoints (especially when their number is large) at startup (or after a major failure) is not scalable since it can cause overload conditions at the gatekeepers. Depending on the number of endpoints, it can take tens of minutes to hours for the CS channel to be established for all endpoints. Thus, endpoints that actually need to use the CS channel (i.e., endpoints making or receiving calls) may be denied service during this time.

SUMMARY

These and other needs are addressed by the various embodiments and configurations of the present invention. The present invention is directed generally to load balancing and heartbeat operations in a telecommunications network.

In a first embodiment, the present invention is directed to a method including the steps:
 (a) at a first time, a gatekeeper and/or server registering an endpoint;
 (b) at a second later time, setting up a call signaling channel between an endpoint and the gatekeeper upon the occurrence of one or more of the following events:
  (i) the endpoint signaling a subscriber operation on the endpoint;
  (ii) the gatekeeper and/or server receiving an incoming call directed to the endpoint; and
  (iii) the gatekeeper and/or server determining that maintenance is to be performed on the endpoint;
 (c) after the second time, the gatekeeper and/or server selecting a gatekeeper for the call signaling channel; and
 (d) after the second time, notifying the endpoint of the selected gatekeeper.

In one configuration, a RAS message is used for initiating the establishment of the call signaling channel between the endpoint and the gatekeeper.

Load balancing when the call signaling channel is established and requiring the gatekeeper/server to initiate call signaling channel set up can be a simple and effective way of distributing the load substantially uniformly among the gatekeepers. Gatekeepers have access to information regarding the current load on every other gatekeeper. The gatekeepers are thus able to pick accurately the least loaded gatekeeper when the call signaling channel is to be established. This prevents the load balancing decision from being made based on stale or invalid information. Moreover, requiring the gatekeeper/server to initiate call signaling channel establishment rather than the endpoint can speed up channel establishment and can be more efficient than the endpoint establishing the channel itself.

In a second embodiment, the present invention is directed to a method including the steps:
 (a) a gatekeeper and/or server registering an endpoint;
 (b) in response to the registering step, determining, based on resource availability, whether to set up a call signaling channel between the gatekeeper and/or server and the endpoint;
 (c) when the occupancy level is less than a selected threshold, establishing the call signaling channel; and
 (d) when the occupancy level is greater than the selected threshold, deferring establishment of the call signaling channel.

The embodiment permits endpoints to make and get calls in an on-demand fashion after registration/re-registration rather than the unpredictable order used in some conventional products.

In a third embodiment, the present invention is directed to a method including the steps:
 (a) a first computational component (e.g., the endpoint) determining whether a first channel (e.g., the call signaling channel) has been established between the first computational component and a second computational component (e.g., the gatekeeper and/or server);
 (b) when the first computational component determines that the first channel has been established, sending to a second computational component a keep alive signal at a first frequency; and
 (c) when the first computational component determines that the first channel has not been established, sending to the second computational component a keep alive signal at a second frequency. The first frequency is lower than the second frequency.

This embodiment can provide an efficient, standards-based heartbeat mechanism that decreases chances of calls not being delivered to an endpoint and of users not being able to make calls. In one configuration, the system uses a RAS keep alive mechanism (which operates at the application level) rather than a TCP keep alive mechanism (which operates at the transport level). The use of the RAS channel increases chances that a call signaling channel will be established successfully. Further, it is efficient since the high frequency lightweight registration request is used only when the call signaling channel does not exist.

These embodiments can be embodied as a computer readable medium comprising executable instructions to perform the above steps.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The Telecommunications System

Figure 1:
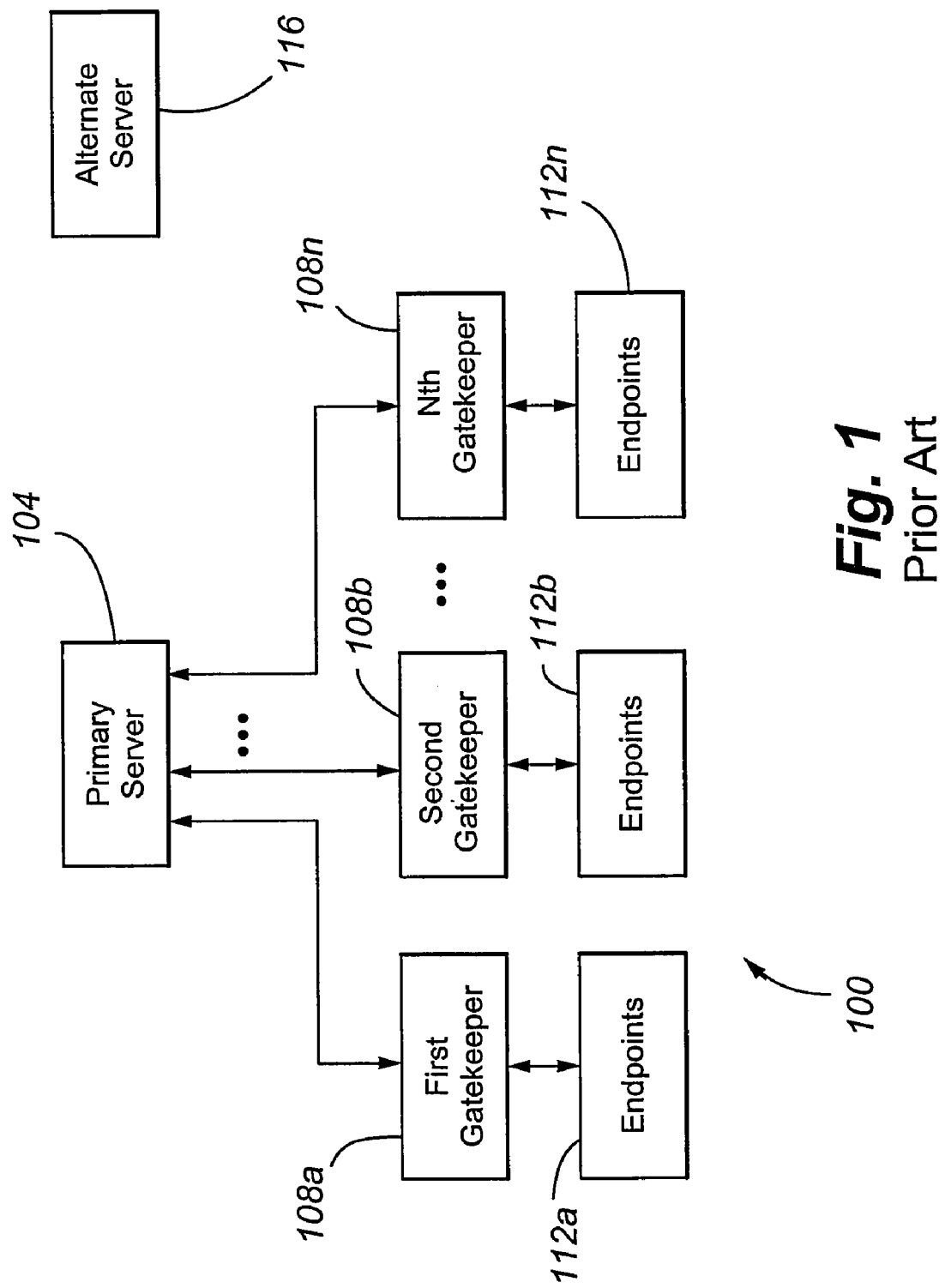
FIG. 1 is a block diagram showing a telecommunications system according to the prior art.
Figure 2:
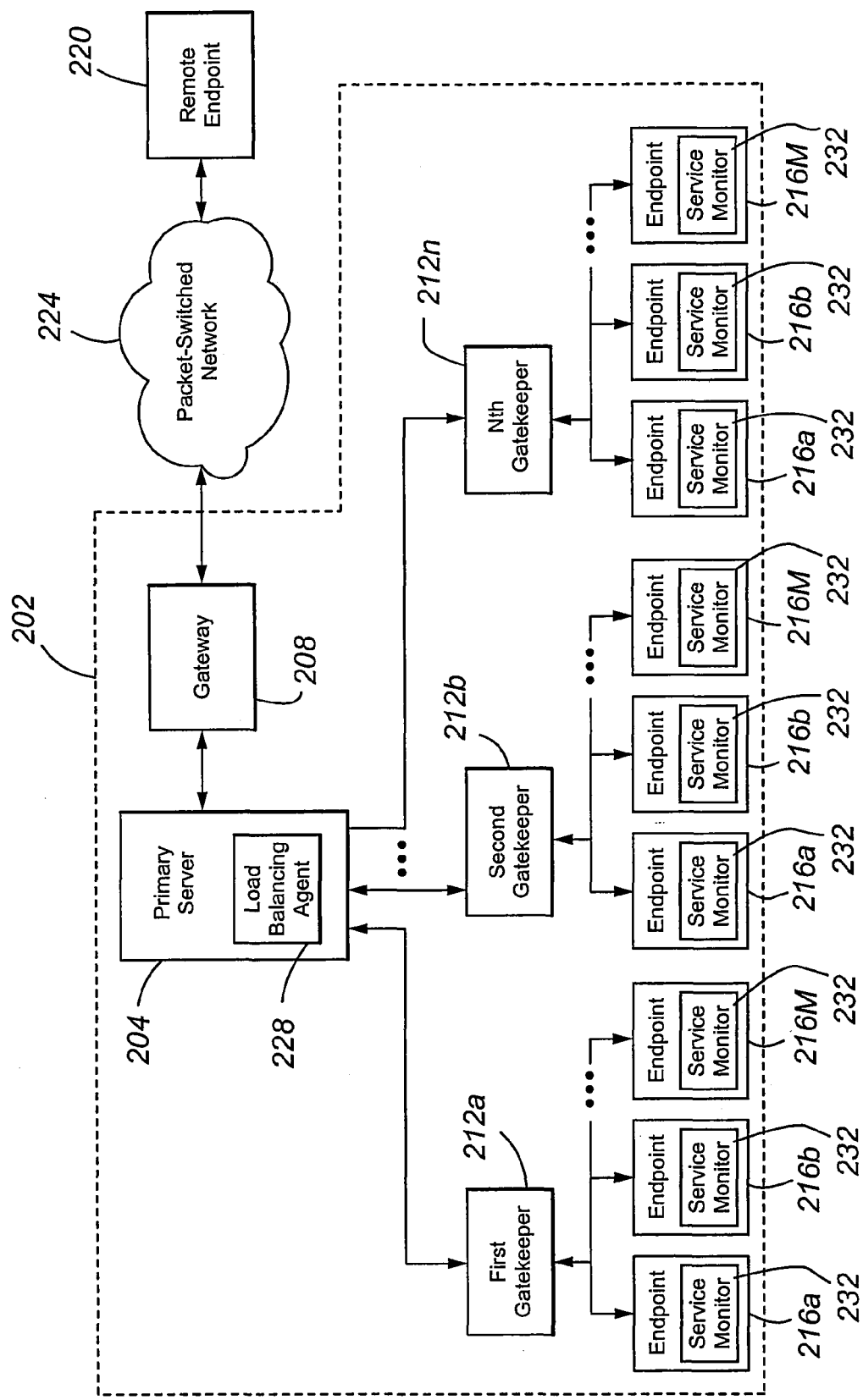
FIG. 2 is a block diagram showing a telecommunications system according to an embodiment of the present invention.

FIG. 2 shows a telecommunications system 200 according to an embodiment of the present invention. The system 200 includes an enterprise network 202 including a primary server 204, a gateway 208, and first, second, . . . nth gatekeepers 212a-n, each of which is servicing a plurality of subscriber endpoints 216a-m. A packet-switched network 224 provides communications between the enterprise network 202 and remote (nonsubscriber) endpoint(s) 220.

The primary server can be any converged architecture for directing circuit-switched and/or packet-switched customer contacts to one or more communication devices. For example, the "primary server" can be a Private Branch Exchange or PBX, an enterprise switch, an enterprise server, or other type of telecommunications system switch or server, as well as other types of processor-based communication control devices such as computers, adjuncts, etc. Typically, the server is a stored-program-controlled system that conventionally includes interfaces to external communication links, a communications switching fabric, service circuits (e.g., tone detectors and generators, etc.), memory for storing control programs and data, and a processor (i.e., a computer) for executing the stored control programs to control the interfaces and the fabric and to provide automatic contact-distribution functionality. Features provided by the media server typically include not only telephony features and intelligent contact routing but also localization, collaboration, mobility, messaging, system management, attendant features, networking, and application programming interfaces. The server typically includes a network interface card (not shown) to provide services to the serviced telecommunication devices. Illustratively, the media server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definty™ Private-Branch Exchange (PBX)-based ACD system; Avaya Inc.'s IP600™ LAN-based ACD system, or an S8100™, S8300™, S8500™, S8700™, or S8710™ media server running a modified version of Avaya Inc.'s Communication Manager™ or MultiVantage™ voice-application software with call processing capabilities and contact center functions. Other types of known switches and servers are well known in the art and therefore not described in detail herein.

Each of the endpoint devices can be one or more packet-switched and/or circuit-switched communication devices. For example, the devices can be Avaya Inc.'s, 4600 Series IP Phones™, IP softphones such as Avaya Inc.'s, IP Softphone™, Personal Digital Assistants or PDAs, Personal Computers or PCs, laptops, H.320 video phones and conferencing units, voice messaging and response units, traditional computer telephony adjuncts, and wired and wireless circuit-switched telephones.

The gateway can be any suitable device(s). As used herein, a "gateway" refers to a functional unit that interconnects two computer networks with differing network architectures, such as an IP network and a circuit-switched network. The gateway is an electronic signal repeater and protocol converter that provides a telephone exchange service, supporting the connection of various types of telephones (such as Digital Control Processor or DCP phones, analog phones, and IP telephones) and outside packet-switched and/or circuit-switched telephone lines (such as analog trunks, ISDN lines, E1/T1 voice trunks, and WAN routing IP trunks). Telephone lines are connected to the gateway via ports and media modules on the chassis, with different media modules providing access ports for different types of telephones and lines. Voice and signaling data between packet-switched and circuit-switched protocols is effected by the media modules converting the voice path to a TDM bus inside the gateway. An engine, such as a Voice Over IP or VoIP engine, converts the voice path from the TDM bus to a compressed or uncompressed and packetized VoIP, typically on an Ethernet connection. Each gateway commonly includes a number of port and trunk circuit packs for performing selected telecommunications functions, such as (DTMF) tone detection, tone generation, playing audio (music and/or voice) announcements, traffic shaping, and call admission control, a media processor, and one or more IP server interfaces. Examples of gateways include Avaya Inc.'s SCC1™, MCC1™, CMC™, G350™, G600™, G650™, and G700™.

The gatekeepers can be any device for performing network administration functions, such as terminal and gateway registration, address resolution, bandwidth control, admission control, etc. To make a connection, an endpoint must reference the electronic (IP) address of the remote endpoint it is calling, whether on a Local Area Network or at the other end of a gateway. The gatekeeper resolves an electronic address for all endpoints under its control, given for example an e-mail address or an alias string or extension, such as a telephone extension.

The enterprise network 202 is connected with a packet-switched network 224, which is commonly a distributed processing network, such as a Wide Area Network or WAN. The network 224 is commonly the Internet.

The remote endpoint 220 represents an external terminal not corresponding to any internal extension of the enterprise network 202. The endpoint 220 is referred to as "external" or "remote" in that it is not directly supported as a terminal endpoints by the enterprise network 202. Like the endpoints 216, the endpoint 220 may be wired or wireless desk sets, mobile telephones, personal computers, PDAs, etc. The endpoint 220 is an example of a device more generally referred to herein as an "external endpoint."

The system 200 considers endpoints 216 to be in-service immediately after they are registered. There are two signaling channels between the primary server and the endpoint, namely a UDP-based H.225.0/RAS channel and the CS channel, which is commonly a TCP-based H.225.0/Q.931 channel (e.g., TCP socket). The CS channel need not be established immediately after registration. The CS channel between an endpoint and a corresponding gatekeeper is established immediately after registration of an endpoint when the CPU occupancy levels of the primary server and/or gatekeeper (as determined by evaluating RAS overload limit) are below a selected threshold but not when the CPU occupancy levels are above the selected threshold. In the latter case, the CS channel is established when needed. Need is defined to be a request to send a common channel message set from either of the primary server or the endpoint.

Registration is persistent. When an endpoint registers, the registration is given a relatively lengthy Time To Live (TTL). The registration will persist for that duration regardless of CS channel failure, network outages, or even restarts of the endpoint. This means that calls will be terminated to the endpoint without the benefit of the CS channel being active. The termination message(s) is resent to the endpoint when the CS channel can be established. In other words, when a call is placed to an endpoint when the CS channel is down, the primary server will attempt to establish the call and proceed as though the endpoint is fully functional (i.e., the caller will hear ringback and connection resources will be reserved for the call). When the CS channel is established, the primary server will resend the termination so as to properly update the endpoint with display, lamp, and ringer information. If the CS channel cannot be established, the call will go unanswered. The primary server will take no special action due to the failure. The call will be treated the same as though the subscriber of the endpoint did not answer. The RAS time-to-live is used to keep registrations alive.

Resiliency to CS channel connection failure is provided. If a connection fails, the system 200 will not rush to re-establish the connection; it will do so either when there is sufficient CPU, during periodic maintenance (e.g., activities such as lamp and button updates, initialization, verification of the registration status of the endpoint, verification of the signaling path of the endpoint, performance of a switch hook query, performance of an ID request, performance of a ringer update, performance of a touch tone update, and checking to see if a soft key download update needs to be done), or when there is a call to or from an endpoint. If there is a user signaled operation on the endpoint while the connection is down, the endpoint will send an admission request to the gatekeeper, which will compel establishment of the signaling connection by the primary server.

Included within the primary server 204 is a load balancing agent 228. The load balancing agent 228 effects load balancing upon the occurrence of a CS channel establishing event. As noted, the events (hereinafter referred to as "channel establishing events") that prompt the initiation of a CS channel with an endpoint include a low CPU occupancy of the primary server, the receipt of an admission request from the endpoint in response to an action by the corresponding subscriber, the receipt of an incoming call set up request to the endpoint from an internal or external endpoint, and periodic maintenance involving the endpoint. Establishment of the CS channel is initiated by the primary server/gatekeeper and not the endpoint because gatekeepers have access to information regarding the current load on every other gatekeeper. To initiate establishment of the CS channel by the primary server, the endpoint will send an admission request message when the user initiates an action, such as originating a call or pressing a button, to multiple gatekeepers instead of directly establishing the channel itself. Sending the admission request message to multiple gatekeepers increases the probability of the message reaching at least one gatekeeper in the event of a failure in connectivity. On receiving the admission request, the gatekeepers, based on current load distribution, select the currently least loaded gatekeeper to open up the channel.

Figure 5:
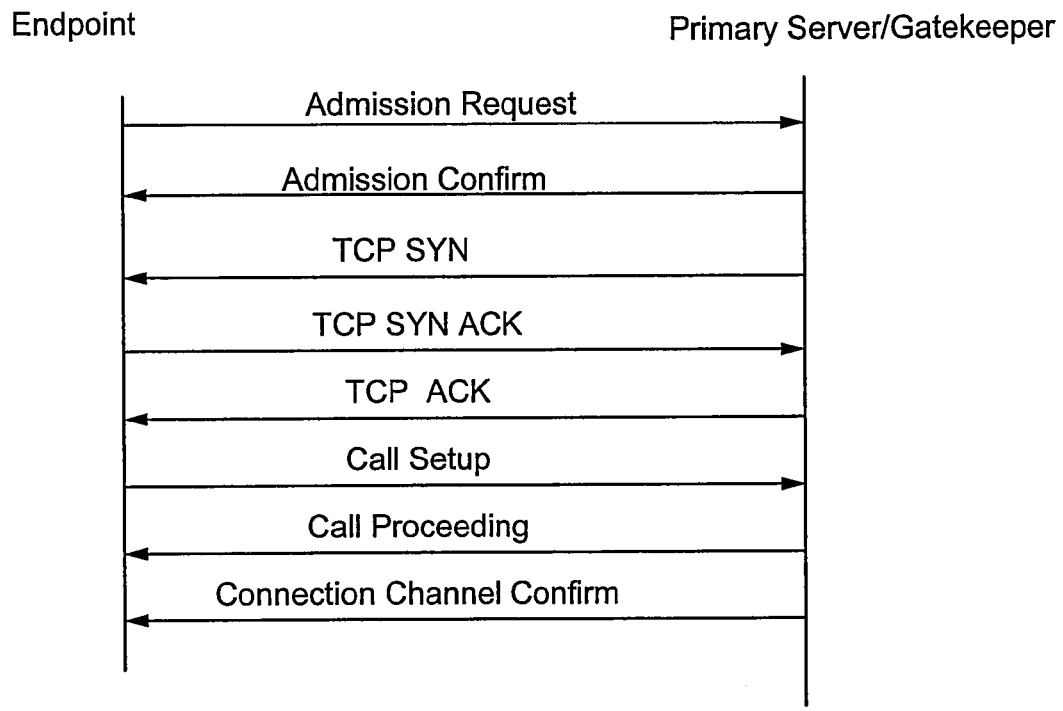
FIG. 5 is a signal flow diagram showing the channel creating process according to an embodiment of the present invention.
Figure 6:
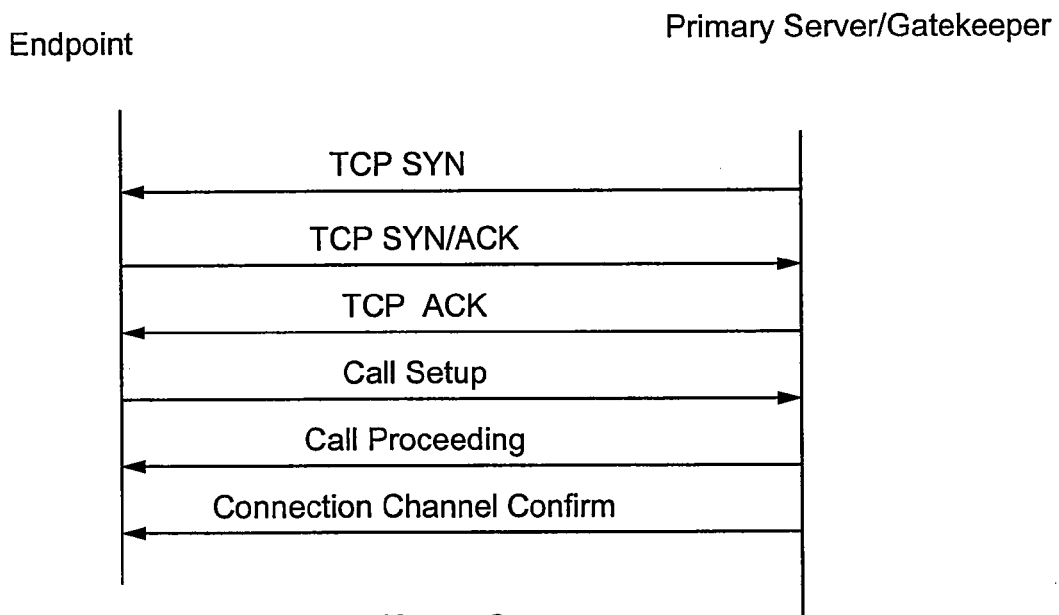
FIG. 6 is a signal flow diagram showing the channel creation process according to another embodiment of the present invention.

FIGS. 5-6 depict the messages exchanged between the primary server/gatekeeper and endpoint to set up a CS channel. Both figures assume that the endpoint has already been registered with a gatekeeper. FIG. 5 is used to set up a CS channel when the subscriber goes off hook or performs another type of activity, such as pressing a button. FIG. 6 is used to set up a CS channel when the primary server/gatekeeper is lightly loaded, when periodic maintenance is performed, and/or when a call needs to be delivered to an endpoint.

With reference to FIG. 5, the admission request message is sent by the endpoint to the top three addresses belonging to its current primary server in the AGL list. On receiving the admission request, the primary server/gatekeepers will select one of the gatekeepers to establish the CS channel with the endpoint. The gatekeepers that received the admission request will reply with the admission confirm (shown) or reject (not shown) message. If the confirm message is sent, it will include information on which gatekeeper has been selected. When the returned message is an admission confirm message, the selected gatekeeper sends a TCP synchronization or SYN to the endpoint. The endpoint responds with a TCP synchronization acknowledgment or SYN/ACK message. The selected gatekeeper responds to the TCP SYN/ACK message with a TCP Acknowledge or ACK message. At this point, the CS channel is established. The endpoint then sends a call set up message (such as a Q.931 (H.323 protocol) or Invite (Session Initiation Protocol or SIP) message) to the primary server/gatekeeper. The primary server/gatekeeper responds with a call proceeding message (such as a Q.931 call proceeding (H.323 protocol) or an Okay (SIP) message). Finally in certain configurations, the primary server/gatekeeper sends to the endpoint a connection channel confirm message (such as a Q.931 connect (H.323 protocol) message). As will be appreciated, other transport layer protocols may be used by the gateway to connect to the endpoint. An example is the Simple Computer Telephony Protocol or SCTP.

FIG. 6 is the same as FIG. 5 except that no admission request and admission confirm/reject messages are exchanged. This is so because the primary server and not the endpoint has initially determined that the CS channel is to be established.

Included within each of the endpoints 216 is a service monitor 232. It is important to detect a failure promptly so that there is no interruption in service to the subscriber. When there is no call at an endpoint and therefore no CS channel, it may take a long time for an endpoint to detect a gatekeeper or network failure. In such cases, timely recovery may not be possible if recovery mechanisms are initiated only when the CS channel needs to be established. The service monitor addresses this problem by using a keep alive scheme on a channel between the primary server/gatekeeper and endpoint, other than the CS channel, to make sure that there is a high probability that the CS channel can be established when needed. Commonly, the other channel is a RAS channel, and the keep alive scheme is a lightweight registration request (also called a keepalive registration request). When the CS channel is not present, the service monitor in each endpoint sends a lightweight registration request at a high frequency (e.g., every 60 seconds) for faster failure detection, regardless of the actual Time To Live or TTL value sent to it by the gatekeeper during registration. When the CS channel is established, each endpoint sends out lightweight registration less frequently (typically based on the TTL value sent to the endpoint by the gatekeeper during registration). For simplicity, the endpoint uses the same gatekeeper for both channels.

Operation of the Load Balancing Agent

Figure 3:
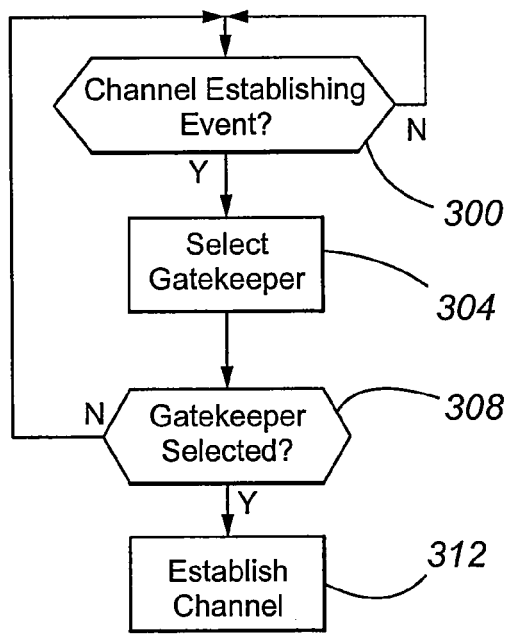
FIG. 3 is a flowchart showing the operation of the load balancing agent according to an embodiment of the present invention.
Figure 4:
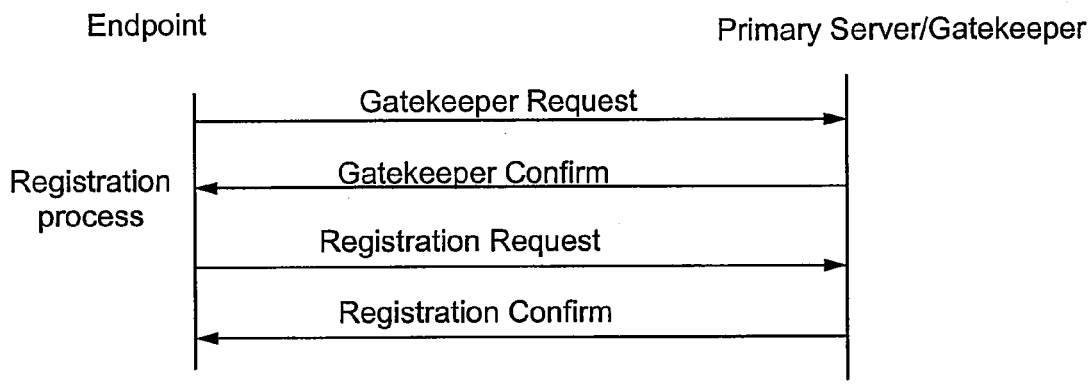
FIG. 4 is a signal flow diagram showing the registration process according to the prior art.

The operation of the load balancing agent 228 will now be discussed with reference to FIGS. 3 and 4.

In decision diamond 300, the agent 228 determines whether a CS channel establishing event has occurred. If no CS channel establishing event has occurred, the agent 228 repeats decision diamond 300 after a determined time interval. If a CS channel establishing event has occurred, the agent 228 proceeds to step 304.

In step 304, the agent 228 selects a gatekeeper to establish the CS channel with the endpoint. The algorithm used to select the gatekeeper initially selects the least loaded gatekeeper within the network region of the endpoint provided one exists and is available. If not, the agent selects the least loaded gatekeeper among all directly connected network regions. If the CS channel is not thereafter established within a selected time interval, upon receipt of the admission request, the agent selects the second least loaded gatekeeper within the network region of the endpoint provided one exists. If no such gatekeeper exists, the agent selects the second least loaded gatekeeper among all directly connected network regions. If the CS channel is not thereafter established within the selected time interval, the agent selects the gatekeeper from which the admission request was received, provided that the gatekeeper is available and had not previously been selected in the first two tries. If the gatekeeper is not available, the agent selects the third least loaded gatekeeper from the network region of the endpoint, provided that one exists. If no such gatekeeper exists or is not available, the agent selects the third least loaded gatekeeper among all directly connected network regions. If the primary server needs to send a call setup message to an endpoint, needs to place a call or wants to establish the CS channel as a result of registration, the agent will initiate a CS channel connect message (e.g., TCP SYN message) to the endpoint. The only difference from the preceeding algorithm is that the third gatekeeper selected by the agent must be the gatekeeper for which the endpoint is currently registered. This is the gateway for which messages were last successfully exchanged with the endpoint. This algorithm requires the primary server/gatekeeper always to initiate the CS channel to the endpoint. In one configuration, the endpoint, for the algorithm to work, must maintain a listen socket on the port it advertised for its call signaling address in the registration request.

In decision diamond 308, the agent determines whether the gatekeeper has been successfully selected. If not, the agent returns to decision diamond 300 to await the next channel establishing event to occur. If all three selected gatekeepers fail (or in the case that three gatekeepers do not exist in all directly connected network regions it would be possible to use all possible gatekeepers), the agent stops attempting to connect to the endpoint until the next CS channel establishing event occurs. If the gatekeeper is successfully selected, the agent in step 312 proceeds with establishing the CS channel between the selected gatekeeper and the endpoint.

Operation of the Service Monitor

Figure 7A:
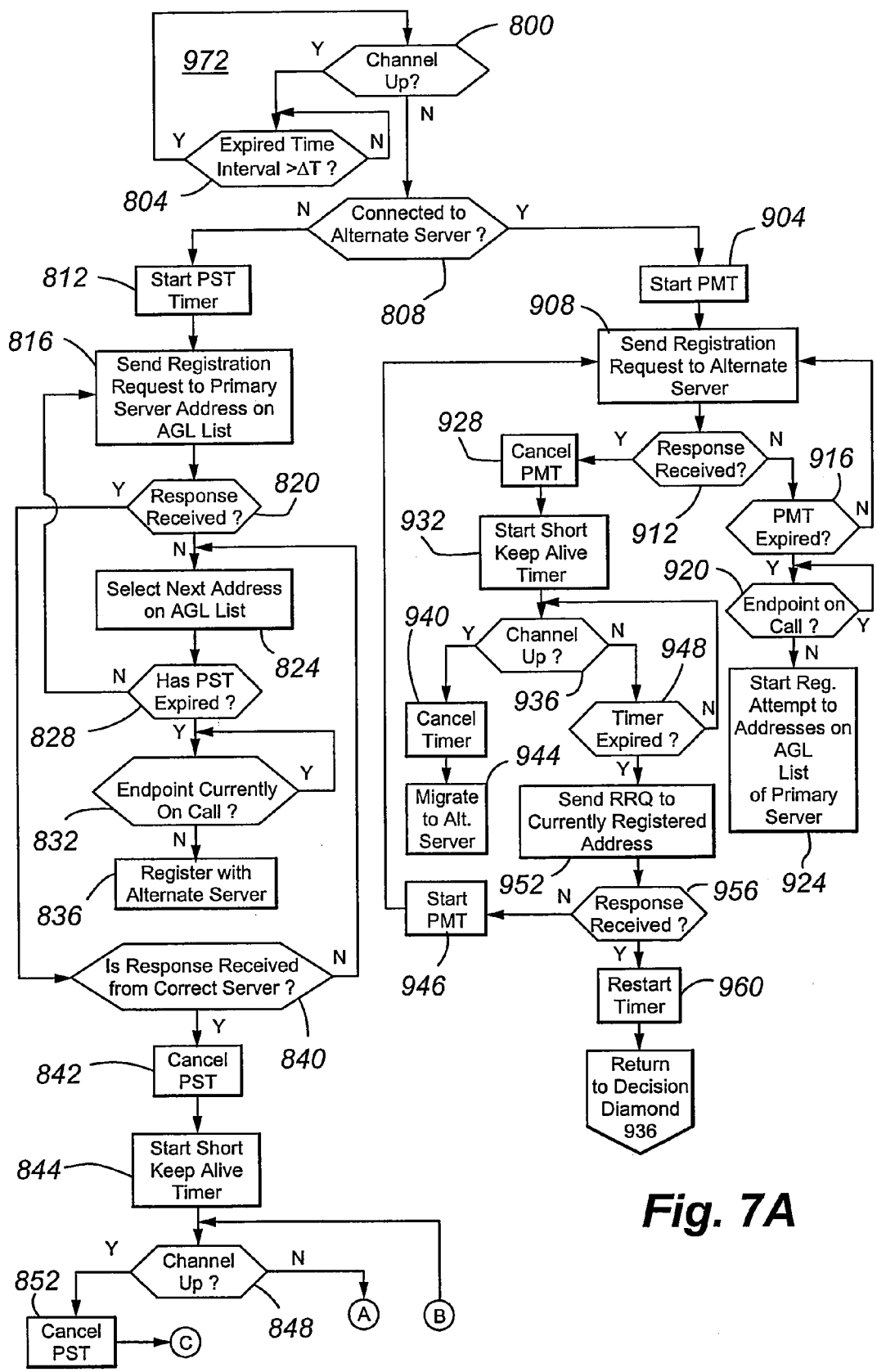
FIGS. 7A and B are flowcharts showing the operation of the service monitor according to an embodiment of the present invention.
Figure 7B:
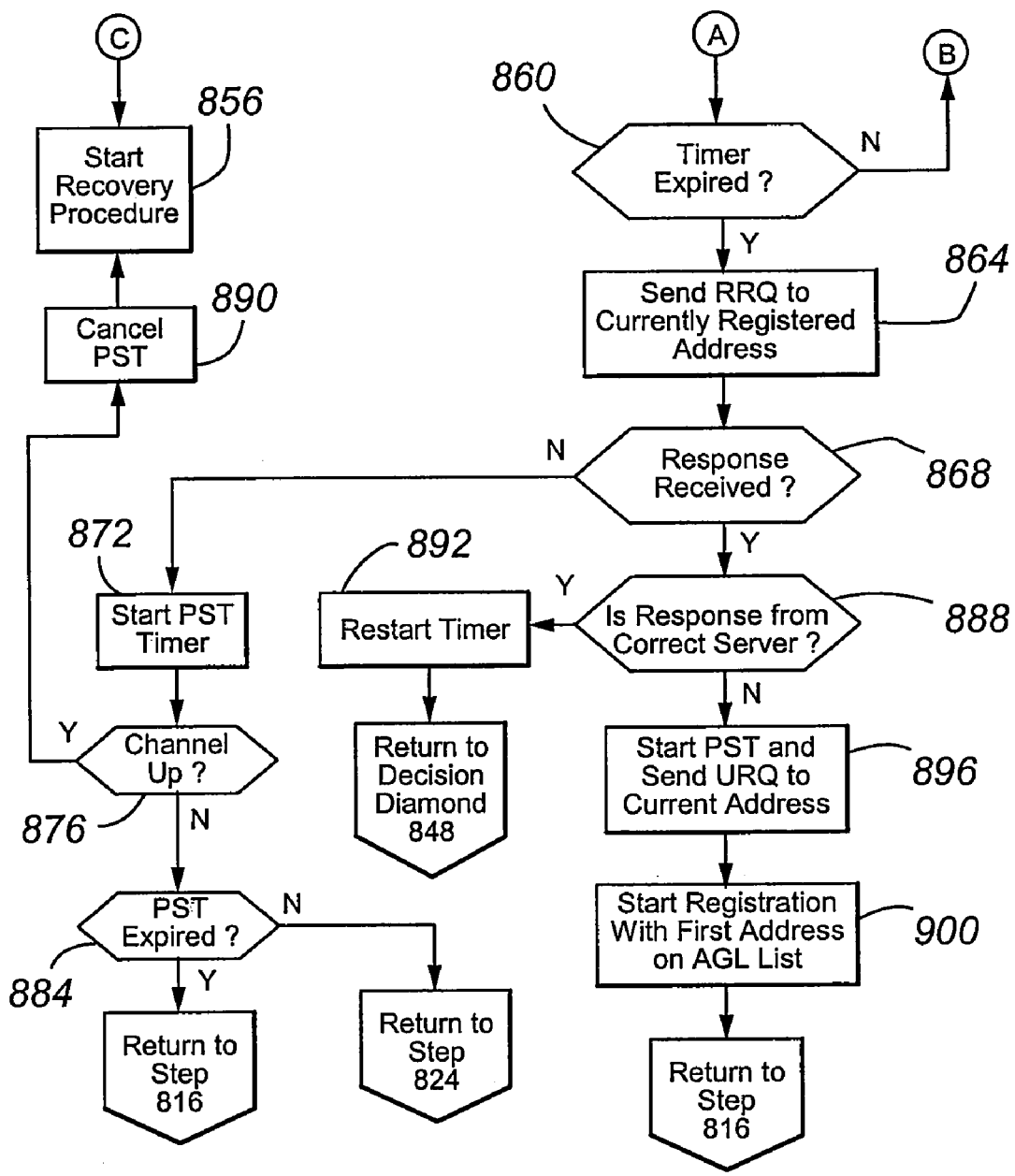

The operation of the service monitor 232 will now be discussed with reference to FIGS. 2 and 7A-B. FIGS. 7A and B assume that the endpoint is registered successfully with the primary server/gatekeeper.

In decision diamond 800, the service monitor determines whether the CS channel is up or down. This determination may be made by a keepalive message failure, the receipt of a message (such as a TCP Finished or TCP FIN message or TCP synchronization or TCP RST) indicating that the CS channel is closed, and re-transmission failure (due to network outage).

If the channel is up, the monitor proceeds to decision diamond 804 and determines whether a selected time interval has expired. If not, the monitor repeats decision diamond 804 until time interval expiration. If so, the monitor sends a keep alive message, which is commonly a lightweight keep alive registration request, to the primary server/gatekeeper and returns to decision diamond 800.

If the channel is down, the monitor proceeds to decision diamond 808 and determines whether or not the endpoint is currently connected to an alternate server, such as an LSP. If the endpoint is not connected to an alternative server (meaning that it is connected to the primary server), the monitor proceeds to step 812 and starts the Primary Search Timer or PST. The PST specifies the amount of time an endpoint should spend connecting back to its primary server or ESS when the endpoint loses its signaling connection to the primary server. This prevents an endpoint from migrating to an alternate server before a media gateway moves to the alternate server. An endpoint cannot obtain service from an alternate server until a media gateway is connected to the alternate server.

In step 816, the monitor sends a keep alive registration request to the first primary server/gatekeeper address on the AGL list. The request is not sent to the current primary server/gatekeeper address because this address is the address where the CS channel connection failed to and the server is still likely not reachable via that address.

In decision diamond 820, the monitor determines whether a response (e.g., a keep alive registration confirmation) was received by the endpoint within a determined period of time. If a response was not timely received, the monitor in step 824 selects the next address on the AGL list. In decision diamond 828, the monitor determines whether the PST has expired. If not, the monitor returns to step 816 and sends a keep alive registration request to the next address. If so, the monitor proceeds to decision diamond 832 and determines whether the endpoint is currently on a call. If so, decision diamond 832 is repeated until the call is over. If not, the monitor proceeds to step 836 and registers with an alternate server.

Returning to decision diamond 820 if a response was timely received, the monitor proceeds to decision diamond 840 and determines whether a response has been received from the correct server. This is typically determined by comparing the module identifier of the primary server against the module identifier contained in the keep alive registration confirmation message. If the identifiers fail to match, the response has not been received from the correct server. If not, the monitor returns to and repeats step 824. If so, the monitor proceeds to step 844 and cancels the PST 842.

In step 844, the monitor starts the short keep alive timer and proceeds to decision diamond 848.

In decision diamond 848, the monitor determines whether the CS channel is up yet. If the CS channel is up, the service monitor cancels the short keep alive timer in step 852 and starts the recovery procedure in step 856. If the CS channel is not up, the service monitor in decision diamond 860 determines whether the short keep alive timer is expired. If not, the service monitor returns to decision diamond 848. If so, the service monitor proceeds to step 864 and sends a keep alive registration request to the gatekeeper with which the endpoint is currently registered.

In decision diamond 868, the service monitor determines whether a response (e.g., a keep alive registration confirm or reject message) has been received within a selected time interval. When a response has not been timely received, the monitor starts the PST timer in step 872 and again determines whether the CS channel is up in decision diamond 876. If the CS channel is up, the monitor cancels the PST in step 880 and proceeds to step 856. If the CS channel is still not up, the monitor in decision diamond 884 determines whether the PST has expired. If not, the monitor returns to and repeats step 824. If so, the monitor returns to and repeats step 816.

Returning to decision diamond 868, when a response has been received the monitor in decision diamond 888 determines whether the response is from the correct server. When the response is from the correct server, the monitor in step 892 restarts the short keep alive timer and returns to decision diamond 848. When the response is not from the correct server, the monitor in step 896 starts the PST and sends an unregistration request to the current address and in step 900 starts registration with the first address on the AGL list. The monitor then returns to step 816.

Returning to decision diamond 808 if the endpoint is connected to an alternative server (meaning that it is not connected to the primary server), the monitor proceeds to step 904 and starts the Primary Migration Timer or PMT. The PMT, like the PST, makes the endpoint's migration behavior consistent with the media gateway's migration behavior. In other words, the PMT prevents the endpoint from migrating back to the primary server before the media gateway connected to the alternate server moves back to the primary server. The PMT is run by an endpoint upon signaling connection loss to the alternate server. While the PMT is running, the endpoint continues trying the alternate server address(es) and does not try registering with its primary server address(es).

In step 908, a keep alive registration request is sent to an address of the alternate server.

In decision diamond 912, the monitor determines whether a response has been received within a determined period of time. If not, the monitor, in decision diamond 916 determines whether the PMT has expired. If the PMT is unexpired, the monitor returns to and repeats step 908 with a next address of the alternate server. If the PMT is expired, the monitor, in decision diamond 920, determines if the endpoint is presently on a call. If the endpoint is on a call, decision diamond 920 is repeated until the call is over. When the endpoint is not presently on a call, the monitor proceeds to step 924 and starts registration attempts to addresses on the AGL list of the primary server.

Returning again to decision diamond 912, when a response has been received the monitor, in step 928, cancels the PMT and, in step 932 starts the short keep alive timer.

In decision diamond 936, the monitor determines whether the CS channel is up yet. If the CS channel is up, the monitor cancels the short keep alive timer in step 940 and returns back to the alternate server in step 944. If the CS channel is not yet up, the monitor, in decision diamond 948, determines whether the short keep alive timer has expired. If not, the monitor returns to and repeats decision diamond 936. If so, the monitor proceeds to step 952.

In step 952, the monitor sends a keep alive registration request to the address with which the endpoint is currently registered.

The monitor next determines, in decision diamond 956, whether a response has been received. If so, the monitor restarts the short keep alive timer in step 960, and returns to decision diamond 936. If a response has not been timely received, the monitor, in step 964, starts the PMT and then returns to send registration request to alternate server step 908. The monitor then returns to decision diamond 912.

In the above flow chart, the frequencies of sending keep alive registration requests are different. The frequency of sending keep alive registration requests in the loop 972 is significantly lower than the frequency of sending such requests in steps 816, 864, 908, 952, and 968. This heartbeat mechanism on the RAS channel can increase chances that a CS channel will be successfully established. It can further be efficient since the high frequency lightweight keep alive registration requests are only used when the CS channel does not exist.

Additionally, the durations of the PST, PMT, and short keep alive timer may be the same or different depending on the application.

A number of variations and modifications of the invention can be used. It would be possible to provide for some features of the invention without providing others.

For example in one alternative embodiment, the various embodiments of the present invention work with protocols other than H.323, such as the Session Initiation Protocol.

In another alternative embodiment, the server, gatekeeper, and/or endpoint can be a software-controlled system including a processing unit (CPU), microprocessor, or other type of digital data processor executing software or an Application-Specific Integrated Circuit (ASIC) as well as various portions or combinations of such elements.

In another embodiment, the logic of the present invention is implemented as software, hardware (such as a logic circuit), or a combination thereof.

In other embodiments, the PST, PMT, and/or short keep alive timer refer to the same timer.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) a first computational component determining whether a first channel has been established between the first computational component and a second computational component;

(b) when the first computational component determines that the first channel has been established, sending to the second computational component a keep alive signal at a first frequency on the first channel, wherein the first channel is a call signaling channel; and (c) when the first computational component determines that the first channel has not been established, sending to the second computational component a registration request at a second frequency, wherein the first frequency is lower than the second frequency and the registration request at the second frequency is sent on a Uniform Datagram Protocol or UDP-based Registration, Admissions and Status or RAS channel, wherein the first computational component is an endpoint, wherein the second computational is at least one of a gatekeeper and server, wherein the registration request is sent on a second channel between the first and second computational components different from the first channel, wherein the first computational component has determined that the first channel has not been established and further comprising:

(d) determining whether the endpoint is currently being serviced by a primary server or an alternate server;

(e) when the endpoint is currently being serviced by a primary server, the endpoint starts a Primary Search Timer (PST); and (f) when the endpoint is currently being serviced by an alternate server, the endpoint starts a Primary Migration Timer (PMT).

2. The method of claim 1, wherein the endpoint is currently being serviced by a primary server and further comprising:

(g) sending a first registration request to a first gatekeeper on an Alternate Gatekeeper List (AGL);

(h) when no response is received within a determined time, selecting a further gatekeeper from the AGL;

(i) sending a further registration request to the further gatekeeper; and (j) repeating steps (h) and (i) until the PST expires and/or a response is received within the determined time; and (k) when a response is not received within the determined time and the PST expires, sending a registration request to an alternate server.

3. The method of claim 2, wherein when a response is received within a determined time and before the PST expires, further comprising:

(l) determining whether the response has been received from the second computational component and/or a third computational component;

(m) when a response has been received from the second computational component and/or the third computational component, starting a short keep alive timer;

(n) determining whether the first channel has been established;

(o) when the first channel has been established, starting a recovery procedure; and (p) when the first channel has not been established, sending a lightweight registration request to a currently registered address associated with at least one of the second and third computational components.

4. The method of claim 1, wherein the endpoint is currently being serviced by a primary server and further comprising:

(g) sending a registration request to an alternate server;

(h) determining whether a response is received within a determined time;

(i) when no response is received within a determined time, repeating steps (g) and (h) until the PMT expires or a response is received; and (k) when a response is not received within the determined time and the PMT expires, sending a lightweight registration request to a primary server.

5. The method of claim 4, further comprising:

(l) when a response is received within a determined time, cancelling the PMT and starting a short keep alive timer;

(m) determining whether the first channel has been established;

(n) when the first channel has been established, migrating to the alternate server; and (o) when the first channel has not been established, sending the lightweight registration request to a currently registered address associated with at least one of the second computational component and a third computational component.

6. A non-transitory computer readable medium comprising processor executable instructions to perform the steps of claim 1.

7. A system comprising:

a first computational component that determines whether a first channel has been established between the first computational component and a second computational component, wherein when the first computational component determines that the first channel has been established, the first computational component sends to the second computational component a keep alive signal at a first frequency on the first channel, wherein the first channel is a call signaling channel and when the first computational component determines that the first channel has not been established, sends to the second computational component a registration request at a second frequency, wherein the first frequency is lower than the second frequency and the registration request at the second frequency is sent on a Uniform Datagram Protocol or UDP-based Registration, Admissions and Status or RAS channel, wherein the first computational component is an endpoint, wherein the second computational is at least one of a gatekeeper and a server, wherein the registration request is sent on a second channel between the first and second computational components different from the first channel, wherein when the first computational component has determined that the first channel has not been established and determined that the endpoint is currently being serviced by a primary server or an alternate server:

the endpoint starts a Primary Search Timer (PST) when the endpoint is currently being serviced by a primary server; and the endpoint starts a Primary Migration Timer (PMT) when the endpoint is currently being serviced by an alternate server.

* * * * *